(12) United States Patent
Park et al.

(10) Patent No.: US 12,334,269 B2
(45) Date of Patent: Jun. 17, 2025

(54) MULTILAYER ELECTRONIC COMPONENT

(71) Applicant: SAMSUNG ELECTRO-MECHANICS CO., LTD., Suwon-si (KR)

(72) Inventors: Yoona Park, Suwon-si (KR); Kangha Lee, Suwon-si (KR); Hye Young Choi, Suwon-si (KR); Dong Ha Kang, Suwon-si (KR); Chul Seung Lee, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 165 days.

(21) Appl. No.: 18/223,739

(22) Filed: Jul. 19, 2023

(65) Prior Publication Data

US 2024/0079182 A1    Mar. 7, 2024

(30) Foreign Application Priority Data

Sep. 2, 2022  (KR) .................. 10-2022-0111579

(51) Int. Cl.
*H01G 4/232* (2006.01)
*H01G 4/248* (2006.01)
*H01G 4/30* (2006.01)

(52) U.S. Cl.
CPC .......... *H01G 4/2325* (2013.01); *H01G 4/248* (2013.01); *H01G 4/30* (2013.01)

(58) Field of Classification Search
CPC ........ H01G 4/2325; H01G 4/248; H01G 4/30; H01G 4/1209; H01G 4/012; H01G 4/12; H01G 4/232; H01G 4/005
See application file for complete search history.

(56) References Cited

U.S. PATENT DOCUMENTS

| 11,769,631 B2 * | 9/2023 | Jung ................... H01G 4/2325 |
| | | 361/306.3 |
| 2010/0118467 A1 * | 5/2010 | Takeuchi ............... H01G 4/232 |
| | | 361/306.3 |

(Continued)

FOREIGN PATENT DOCUMENTS

| CN | 114388263 A  *  4/2022  ........... H01G 4/2325 |
| CN | 114694971 A  *  7/2022  ............. H01G 4/002 |

(Continued)

OTHER PUBLICATIONS

Partial European Search Report dated Feb. 6, 2024 issued in European Patent Application No. 23186353.1.

*Primary Examiner* — Dion R. Ferguson
(74) *Attorney, Agent, or Firm* — Morgan Lewis & Bockius LLP

(57) ABSTRACT

A multilayer electronic component, in which an external electrode may include a base electrode layer disposed on a surface of a body of the multilayer electronic component and connected to internal electrodes of the body, an intermediate electrode layer disposed on a corner of the body and connected to the base electrode layer, a conductive resin layer disposed on the intermediate electrode layer, and a plating layer disposed on the conductive resin layer. The intermediate electrode layer may be in contact with the plating layer on the corner of the body to prevent an increase in ESR while preventing cracks due to mounting through the conductive resin layer.

25 Claims, 6 Drawing Sheets

(56) References Cited

U.S. PATENT DOCUMENTS

| | | | |
|---|---|---|---|
| 2013/0170095 A1* | 7/2013 | Oh | H01G 4/008 361/305 |
| 2013/0208401 A1* | 8/2013 | Shirakawa | H01G 13/06 216/13 |
| 2014/0116766 A1* | 5/2014 | Jeon | H05K 3/3442 361/321.2 |
| 2014/0254064 A1* | 9/2014 | Miyazaki | H01G 4/2325 427/535 |
| 2015/0162132 A1* | 6/2015 | Kwag | H01G 4/2325 361/301.4 |
| 2018/0068792 A1* | 3/2018 | Egashira | H01B 1/02 |
| 2018/0151296 A1* | 5/2018 | Yamada | H01G 2/065 |
| 2018/0174753 A1* | 6/2018 | Terashita | H01G 4/008 |
| 2019/0066923 A1* | 2/2019 | Jung | H01G 4/008 |
| 2019/0237250 A1* | 8/2019 | Onodera | H01G 2/065 |
| 2019/0371527 A1* | 12/2019 | Sugita | H01G 4/232 |
| 2020/0211774 A1* | 7/2020 | Onodera | H01G 4/248 |
| 2020/0211775 A1* | 7/2020 | Onodera | H01G 4/012 |
| 2021/0065980 A1* | 3/2021 | Jung | H01G 4/30 |
| 2021/0265114 A1* | 8/2021 | Park | H01G 4/248 |
| 2022/0392707 A1* | 12/2022 | Lee | H01G 4/012 |
| 2024/0079182 A1* | 3/2024 | Park | H01G 4/2325 |

FOREIGN PATENT DOCUMENTS

| | | | | |
|---|---|---|---|---|
| JP | H08-107039 | A | | 4/1996 |
| JP | 3307133 | B2 | * | 7/2002 |
| JP | 2010-118499 | A | | 5/2010 |
| JP | 2010226017 | A | * | 10/2010 |
| JP | 2018014447 | A | * | 1/2018 |
| JP | 2022183976 | A | * | 12/2022 ... H01G 2/06 |
| KR | 10-2019-0116165 | A | | 10/2019 |
| KR | 10-2020-0122058 | A | | 10/2020 |
| KR | 10-2021-0106689 | A | | 8/2021 |
| WO | WO-2023113335 | A1 | * | 6/2023 |

* cited by examiner

MULTILAYER ELECTRONIC COMPONENT

CROSS-REFERENCE TO RELATED APPLICATION(S)

This application claims benefit of priority to Korean Patent Application No. 10-2022-0111579 filed on Sep. 2, 2022 in the Korean Intellectual Property Office, the disclosure of which is incorporated herein by reference in its entirety.

TECHNICAL FIELD

The present disclosure relates to a multilayer electronic component.

BACKGROUND

A Multilayer Ceramic Capacitor (MLCC), a multilayer electronic component, is a chip-type capacitor mounted on the printed circuit boards of various electronic products including video display devices such as liquid crystal displays (LCDs) and plasma display panels (PDPs), computers, smartphones, and mobile phones, to serve to charge or discharge electricity.

Multilayer ceramic capacitors may be used as components of various electronic devices due to the advantages of being small, high capacitance guaranteed, and easy to mount. As various electronic devices such as computers and mobile devices are miniaturized and high-powered, the demand for miniaturization and high capacitance multilayer ceramic capacitors has increased.

In the related art, when forming an external electrode of a multilayer ceramic capacitor, a method of dipping the exposed surface of the internal electrode of the body into a conductive paste containing a conductive metal is mainly used. However, in the external electrode formed by the dipping method, the thickness of the external electrode may not be uniform, and the external electrode may be formed to be excessively thin at the corner of the body, whereas an excessively thick external electrode was formed in the central portion of the body. Therefore, it may be difficult to secure capacitance per unit volume of the multilayer ceramic capacitor, and a plating solution and/or moisture may penetrate into the body through the corner portion of the body, thereby causing a problem in which reliability of the multilayer ceramic capacitor is reduced.

In addition, in the related art, a conductive resin layer is formed on the sintered electrode layer to prevent cracks caused by warping of the substrate during mounting. However, if the conductive resin layer is formed to be too thick, it may be difficult to secure capacitance per unit volume of the multilayer ceramic capacitor, and lifting may occur at the interface with the sintered electrode layer, resulting in a decrease in moisture resistance reliability. The conductive resin layer has a high resistance, and thus, there may be a problem in that the Equivalent Series Resistance (ESR) is higher than that of multilayer ceramic capacitors that do not include the conductive resin layer.

SUMMARY

An aspect of the present disclosure is to prevent cracks due to mounting while securing capacitance per unit volume.

An aspect of the present disclosure is to prevent penetration of a plating solution and/or moisture into the body while securing capacitance per unit volume.

An aspect of the present disclosure is to prevent an increase in ESR while preventing cracks caused by mounting.

According to an aspect of the present disclosure, a multilayer electronic component includes a body including a dielectric layer and first and second internal electrodes alternately disposed with the dielectric layer interposed therebetween, and having a first surface and a second surface opposing each other in a first direction, a third surface and a fourth surface connected to the first and second surfaces and opposing each other in a second direction, and a fifth surface and a sixth surface connected to the first to fourth surfaces and opposing each other in a third direction, the body including a first corner connecting the third surface to the first, second, fifth, and sixth surfaces and a second corner connecting the fourth surface to the first, second, fifth, and sixth surfaces; a first external electrode including a first base electrode layer disposed on the third surface, a first intermediate electrode layer disposed on the first corner and connected to the first base electrode layer, a first conductive resin layer disposed on the first intermediate electrode layer, and a first plating layer disposed on the first conductive resin layer; and a second external electrode including a second base electrode layer disposed on the fourth surface, a second intermediate electrode layer disposed on the second corner and connected to the second base electrode layer, a second conductive resin layer disposed on the second intermediate electrode layer, and a second plating layer disposed on the second conductive resin layer. At least a portion of the first intermediate electrode layer is in contact with the first plating layer on the first corner, and at least a portion of the second intermediate electrode layer is in contact with the second plating layer on the second corner.

According to another aspect of the present disclosure, a multilayer electronic component includes a body including a dielectric layer and first and second internal electrodes alternately disposed with the dielectric layer interposed therebetween, and having a first surface and a second surface opposing each other in a first direction, a third surface and a fourth surface connected to the first and second surfaces and opposing each other in a second direction, and a fifth surface and a sixth surface connected to the first to fourth surfaces and opposing each other in a third direction, the body including a first corner connecting the third surface and the first, second, fifth, and sixth surfaces and a second corner connecting the fourth surface and the first, second, fifth, and sixth surfaces; a first external electrode including a first base electrode layer disposed on the third surface, a first intermediate electrode layer disposed on the first corner and connected to the first base electrode layer, and a first conductive resin layer disposed on the first intermediate electrode layer; and a second external electrode including a second base electrode layer disposed on the fourth surface, a second intermediate electrode layer disposed on the second corner and connected to the second base electrode layer, and a second conductive resin layer disposed on the second intermediate electrode layer. The first base electrode layer includes a region not covered by the first intermediate electrode layer, and the second base electrode layer includes a region not covered by the second intermediate electrode layer.

According to still another aspect of the present disclosure, a multilayer electronic component includes a body including a dielectric layer and first and second internal electrodes alternately disposed with the dielectric layer interposed therebetween, and having a first surface and a second surface opposing each other in a first direction, a third surface and a fourth surface connected to the first and second surfaces and opposing each other in a second direction, and a fifth surface and a sixth surface connected to the first to fourth surfaces and opposing each other in a third direction, the body including a first corner connecting the third surface and the first, second, fifth, and sixth surfaces and a second corner connecting the fourth surface and the first, second, fifth, and sixth surfaces; a first external electrode including a first base electrode layer disposed on the third surface, a first intermediate electrode layer disposed on the first corner and connected to the first base electrode layer, and a first conductive resin layer disposed on the first intermediate electrode layer; and a second external electrode including a second base electrode layer disposed on the fourth surface, a second intermediate electrode layer disposed on the second corner and connected to the second base electrode layer, a second conductive resin layer disposed on the second intermediate electrode layer. The first conductive resin layer includes at least one first opening disposed on the first corner, and the second conductive resin layer includes at least one second opening disposed on the second corner.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
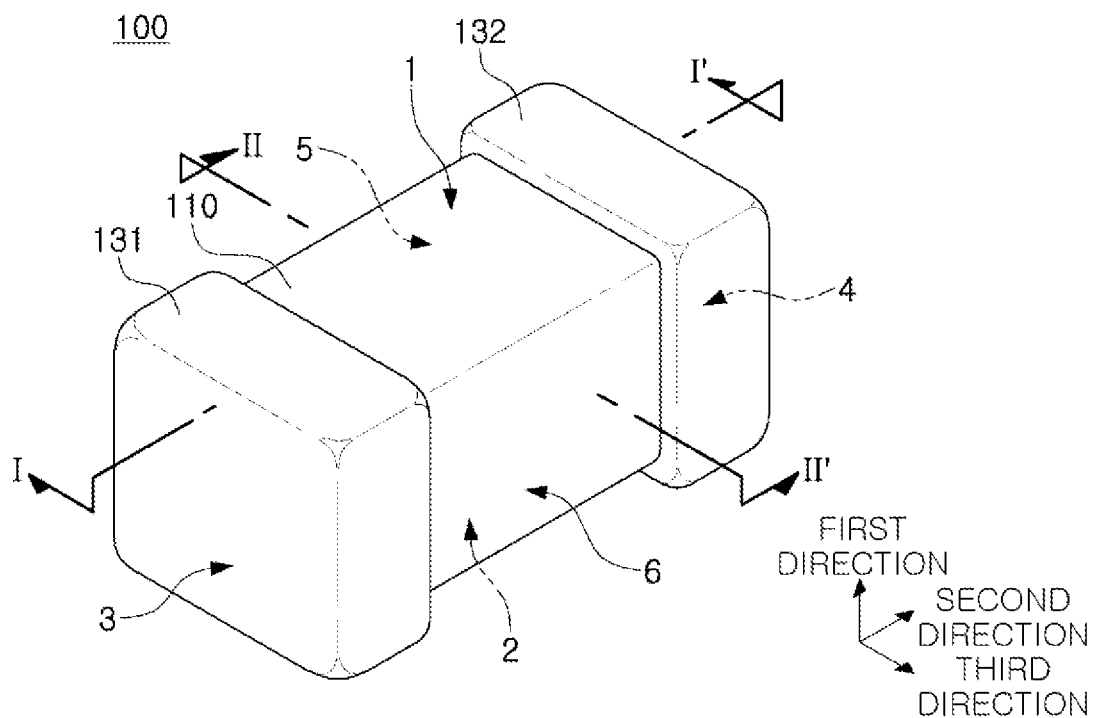
FIG. 1 is a perspective view schematically illustrating a multilayer electronic component according to an embodiment.

Hereinafter, embodiments of the present disclosure will be described with reference to detailed embodiments and accompanying drawings. However, the embodiments of the present disclosure may be modified in many different forms, and the scope of the present disclosure is not limited to the embodiments described below. In addition, the embodiments of the present disclosure are provided to more completely describe the present disclosure to those skilled in the art. Therefore, the shape and size of elements in the drawings may be exaggerated for clearer explanation, and elements indicated by the same reference numerals in the drawings are the same elements.

In addition, to clearly describe the present disclosure in the drawings, parts irrelevant to the description are omitted, and the size and thickness of each component illustrated in the drawings are arbitrarily illustrated for convenience of description, and thus, the present disclosure is not necessarily limited to the illustrated embodiment. Also, components having the same function within the scope of the same concept are described using the same reference numerals. Furthermore, throughout the specification, when a certain component is said to "include," it means that it may further include other components without excluding other components unless otherwise stated.

In the drawings, the first direction may be defined as the thickness (T) direction, the second direction may be defined as the length (L) direction, and the third direction may be defined as the width (W) direction.

FIG. 1 is a perspective view schematically illustrating a multilayer electronic component according to an embodiment.

Figure 2:
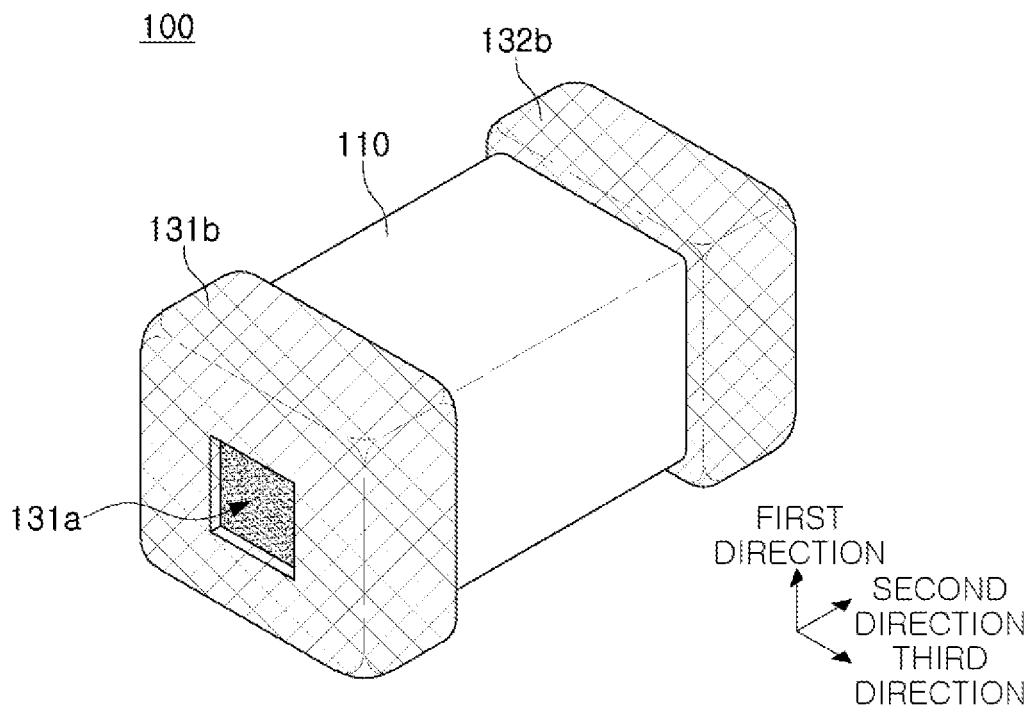
FIG. 2 is a perspective view schematically illustrating a structure in which a base electrode layer and an intermediate electrode layer are disposed on a body of a multilayer electronic component according to an embodiment.

FIG. 2 is a perspective view schematically illustrating a structure in which a base electrode layer and an intermediate electrode layer are disposed on a body of a multilayer electronic component according to an embodiment.

Figure 3:
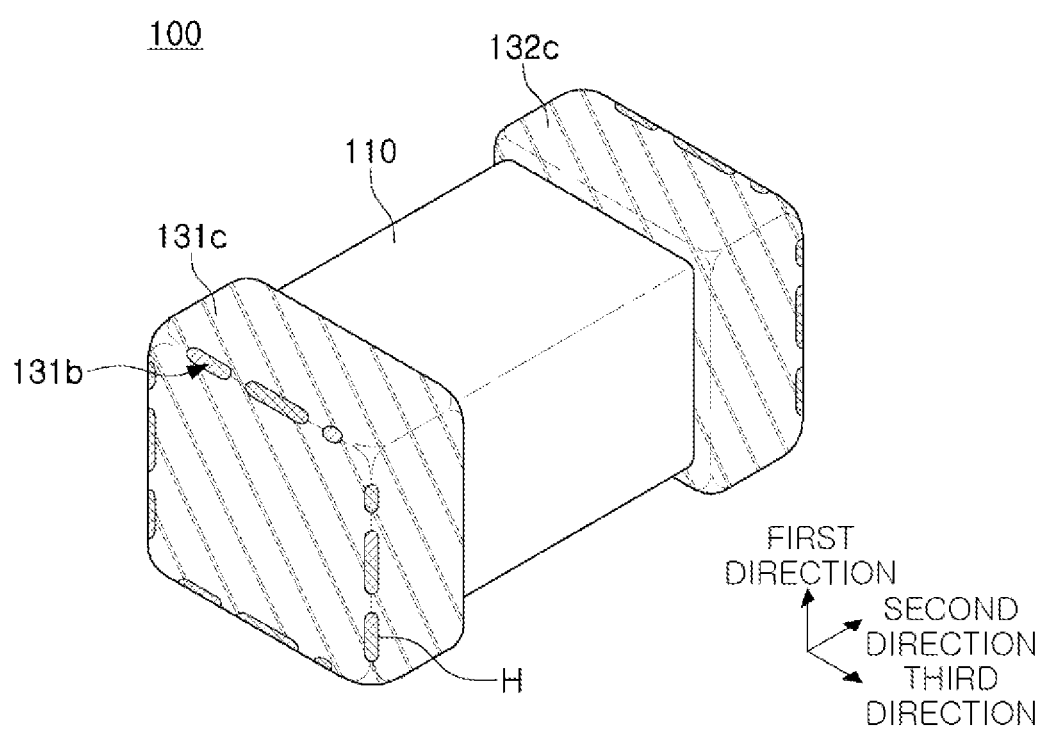
FIG. 3 is a perspective view schematically illustrating a structure in which a base electrode layer, an intermediate electrode layer, and a conductive resin layer are disposed on a body of a multilayer electronic component according to an embodiment.

FIG. 3 is a perspective view schematically illustrating a structure in which a base electrode layer, an intermediate electrode layer, and a conductive resin layer are disposed on a body of a multilayer electronic component according to an embodiment.

Figure 4:
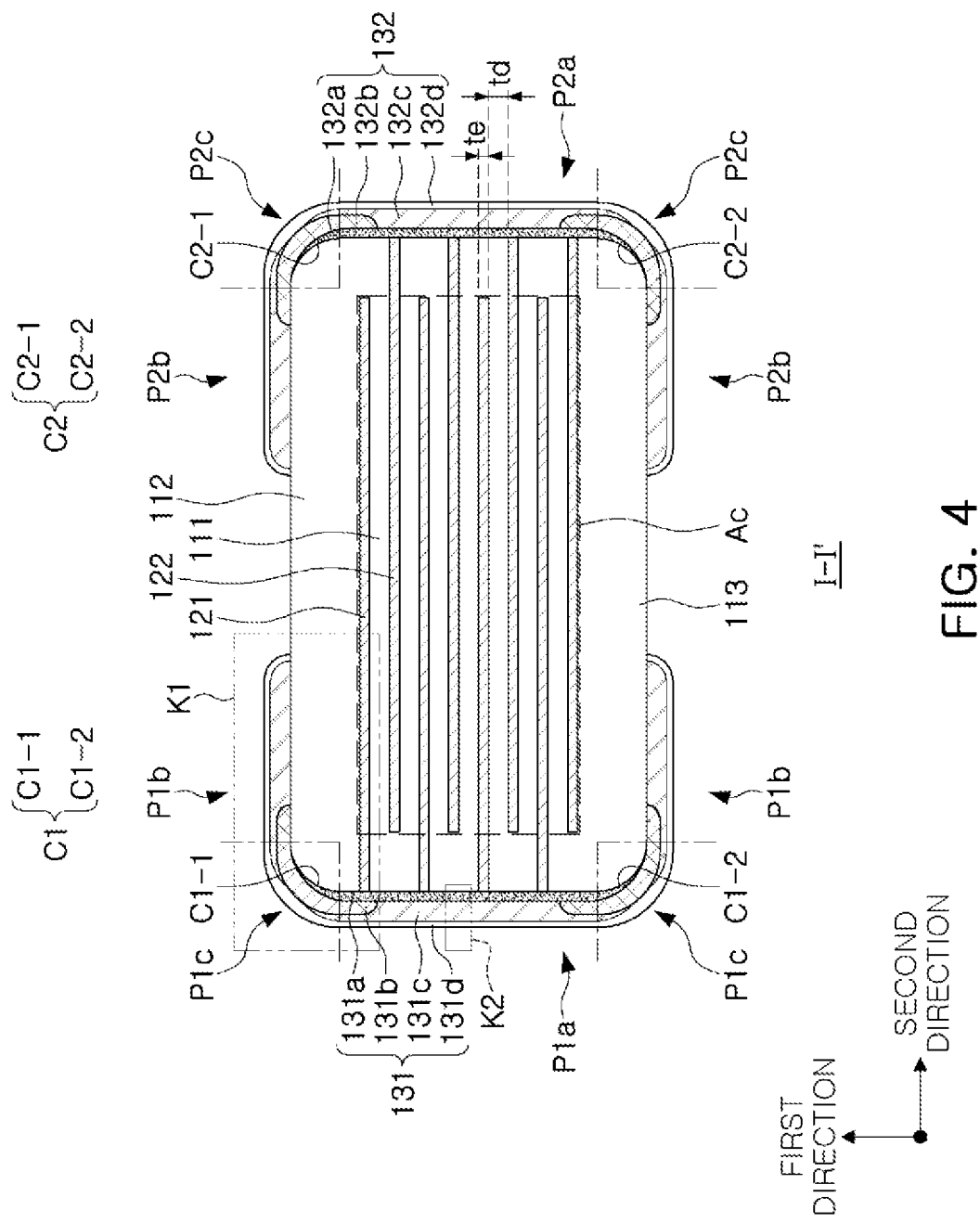
FIG. 4 is a cross-sectional view schematically illustrating a section taken along line I-I' of FIG. 1.

FIG. 4 is a cross-sectional view schematically illustrating a cross section taken along line I-I' of FIG. 1.

Figure 5:
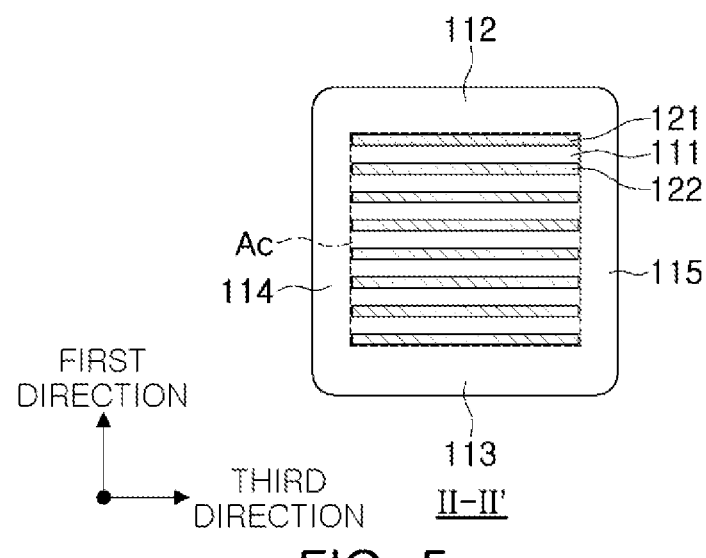
FIG. 5 is a cross-sectional view schematically illustrating a section II-II' of FIG. 1.

FIG. 5 is a cross-sectional view schematically illustrating a cross section taken along line II-II' of FIG. 1.

Figure 6:
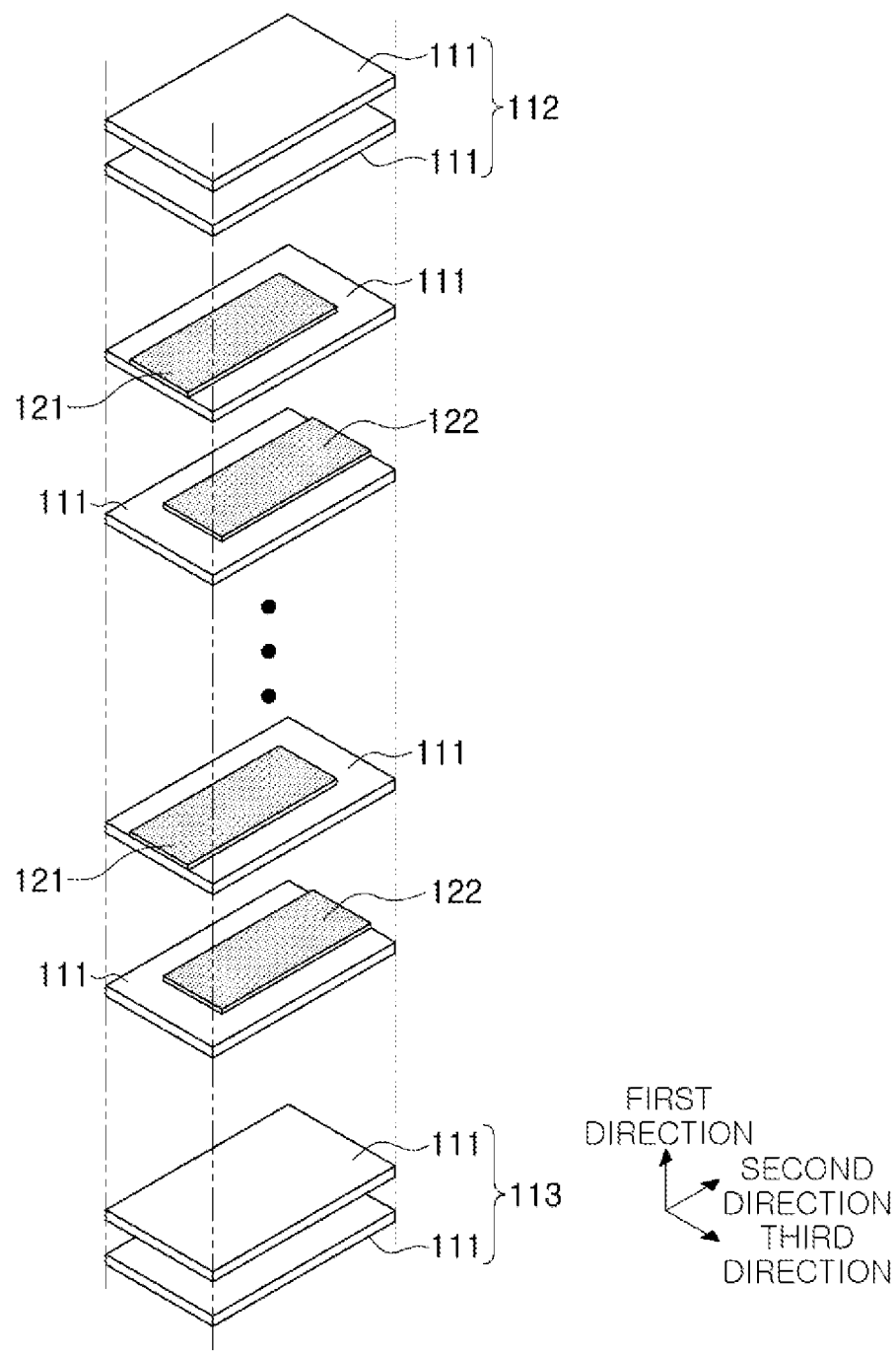
FIG. 6 is an exploded perspective view schematically illustrating an exploded body of a multilayer electronic component according to an embodiment.

FIG. 6 is an exploded perspective view schematically illustrating an exploded body of a multilayer electronic component according to an embodiment.

Figure 7:
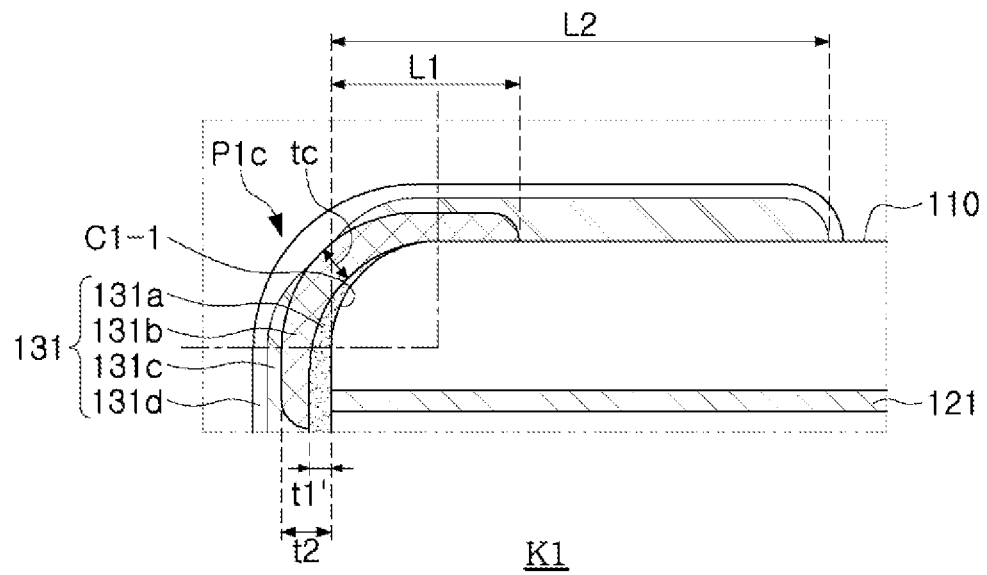
FIG. 7 is an enlarged view of region K1 of FIG. 4.

FIG. 7 is an enlarged view of region K1 of FIG. 4.

Figure 8:
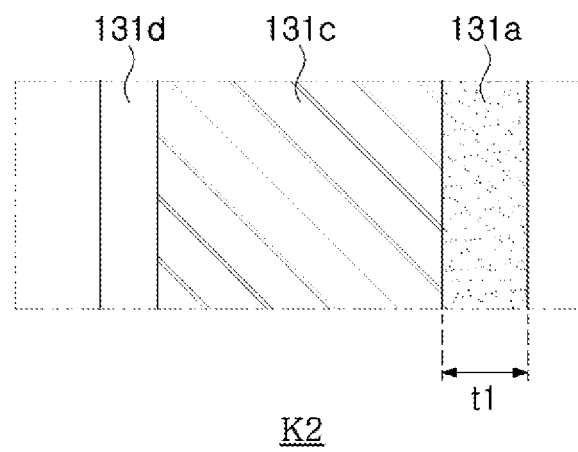
FIG. 8 is an enlarged view of region K2 of FIG. 4.

FIG. 8 is an enlarged view of region K2 of FIG. 4.

Referring to the drawings, a multilayer electronic component 100 according to an embodiment may include a body 110 including a dielectric layer 111 and first and second internal electrodes 121 and 122 alternately disposed with the dielectric layer 111 interposed therebetween, and having first and second surfaces 1 and 2 opposing each other in the first direction, third and fourth surfaces 3 and 4 connected to the first and second surfaces 1 and 2 and opposing each other in the second direction, and fifth and sixth surfaces 5 and 6 connected to the first to fourth surfaces 1, 2, 3 and 4 and opposing each other in a third direction, the body 110 including a first corner C1 connecting the third surface 3 and the first, second, fifth, and sixth surfaces 1, 2, 5 and 6, respectively, and a second corner C2 connecting the fourth surface 4 and the first, second, fifth, and sixth surfaces 1, 2, 5 and 6, respectively; a first external electrode 131 including a first base electrode layer 131a disposed on the third surface 3, a first intermediate electrode layer 131b disposed on the first corner C1 and connected to the first base electrode layer 131a, a first conductive resin layer 131c disposed on the first intermediate electrode layer 131b, and a first plating layer 131d disposed on the first conductive resin layer 131c; and a second external electrode 132 including a second base electrode layer 132a disposed on the fourth surface 4, a second intermediate electrode layer 132b disposed on the second corner C2 and connected to the second base electrode layer 132a, a second conductive resin layer 132c disposed on the second intermediate electrode layer 132b, and a second plating layer 132d disposed on the second conductive resin layer 132c. At least a portion of the first intermediate electrode layer 131b may be in contact with the first plating layer 131d on the first corner C1, and at least a portion of the second intermediate electrode layer 132b may be in contact with the second plating layer 132d on the second corner C2.

As described above, in the case of the external electrode according to the related art, external electrodes are formed too thick in the central part of the body, and external electrodes are formed too thin in the corner portion of the body. Therefore, there are problems in that the capacitance per unit volume is lowered and the reliability of the multilayer electronic component is reduced because the plating solution and/or moisture penetrates into the inside of the body through the corner portion of the body. In addition, in a case in which a conductive resin layer is formed on the sintered electrode layer to prevent cracking due to mounting, there is a problem that ESR increases due to the conductive resin layer having high resistance.

Meanwhile, in the case of the multilayer electronic component 100 according to an embodiment of the present disclosure, by including intermediate electrode layers 131b and 132b disposed on the corners C1 and C2 of the body 110 and conductive resin layers 131c and 132c disposed on the intermediate electrode layers, capacitance per unit volume may be secured, cracks due to mounting may be prevented, and penetration of a plating solution and/or external moisture through the corner of the body may be prevented. In addition, at least portions of the intermediate electrode layers 131b and 132b are in contact with the plating layers 131d and 132d on the corner of the body, thereby preventing an increase in ESR while preventing cracks due to mounting through the conductive resin layers 131c and 132c.

Hereinafter, respective components included in the multilayer electronic component 100 according to an embodiment will be described in more detail.

Although the detailed shape of the body 110 is not particularly limited, as illustrated, the body 110 may have a hexahedral shape or a shape similar thereto. Due to shrinkage of the ceramic powder included in the body 110 during the sintering process or polishing of the corners, the body 110 may not have a hexahedral shape with perfect straight lines, but may substantially have a hexahedral shape.

The body 110 may have first and second surfaces 1 and 2 opposing each other in the first direction, third and fourth surfaces 3 and 4 connected to the first and second surfaces 1 and 2 and opposing each other in the second direction, and fifth and sixth surfaces 5 and 6 connected to the first to fourth surfaces 1, 2, 3, and 4 and opposing each other in the third direction. In addition, the body 110 may include a first corner C1 connecting the third surface 3, the first surface 1, the second surface 2, the fifth surface 5, and the sixth surface 6, respectively, and include a second corner C2 connecting the fourth surface 4 to the first surface 1, the second surface 2, the fifth surface 5, and the sixth surface 6, respectively.

The first corner C1 may include a 1-1-th corner C1-1 connecting the third surface 3 and the first surface 1, and a 1-2-th corner C1-2 connecting the third surface 3 and the second surface 2, and the second corner C2 may include a 2-3-th corner C2-1 connecting the fourth surface 4 and the first surface 1, and a 2-2-th corner C2-2 connecting the fourth surface 4 and the second surface 2. In addition, the first corner C1 may include a 1-5-th corner connecting the third and fifth surfaces 3 and 5, and a 1-6-th corner connecting the third surface 3 and the sixth surface 6, and the second corner C2 may include a 2-5-th corner connecting the fourth and fifth surfaces 4 and 5 and a 2-6-th corner connecting the fourth and sixth surfaces 4 and 6.

The corner may have a round shape by rounding the corner connecting respective sides of the body 110 by performing a separate process. The first to sixth surfaces 1 to 6 of the body 110 may be substantially flat surfaces, and non-flat areas may be viewed as corners.

In the body 110, dielectric layers 111 and internal electrodes 121 and 122 may be alternately stacked. The plurality of dielectric layers 111 forming the body 110 are in a sintered state, and a boundary between adjacent dielectric layers 111 may be unified to the extent that it is difficult to confirm without using a scanning electron microscope (SEM).

The dielectric layer 111 may be formed by preparing a ceramic slurry containing ceramic powder, an organic solvent and a binder, applying and drying the slurry on a carrier film to prepare a ceramic green sheet, and then by sintering the ceramic green sheet. The ceramic powder is not particularly limited as long as sufficient capacitance may be obtained, but, for example, barium titanate-based ($BaTiO_3$)-based powder may be used.

The average thickness td of the dielectric layer 111 is not particularly limited, but may be, for example, 10 μm or less. In addition, the average thickness td of the dielectric layer 111 may be arbitrarily set according to required characteristics or uses. For example, in the case of high-voltage electronic components, the average thickness td of the dielectric layer 111 may be less than 2.8 μm, and in the case of small IT electronic components, the average thickness td of the dielectric layer 111 may be 0.4 μm or less to obtain miniaturization and high capacitance, but the present disclosure is not limited thereto.

In general, as the thickness of the dielectric layer 111 decreases, cracks are easily generated in the body 110 due to bending stress generated when voltage is applied. Accordingly, there is a problem in that the reliability of the multilayer electronic component is lowered. Meanwhile, in the case of the multilayer electronic component according to an embodiment of the present disclosure, as the external electrodes 131 and 132 include the base electrode layers 131a and 132a, the intermediate electrode layers 131b and 132b, and the conductive resin layers 131c and 132c, even when the average thickness td of the dielectric layer 111 is less than 2.8 μm or 0.4 μm or less, the reliability of the multilayer electronic component may be improved.

In this case, the average thickness td of the dielectric layer 111 refers to the size of the dielectric layer 111 disposed between the internal electrodes 121 and 122 in the first direction. The average thickness of the dielectric layer 111 may be measured by scanning a cross section of the body 110 in the first and second directions with a scanning electron microscope (SEM) at a magnification of 10,000. In more detail, an average value may be measured by measuring the thickness at a plurality of points of one dielectric layer 111, for example, at 30 points equally spaced in the second direction. The 30 equally spaced points may be designated in a capacitance formation portion Ac to be described later. In addition, when the average value is measured by extending this average value measurement to 10 dielectric layers 111, the average thickness of the dielectric layer 111 may be further generalized.

The internal electrodes 121 and 122 may be alternately disposed with the dielectric layer 111. For example, the first internal electrode 121 and the second internal electrode 122, which are a pair of electrodes having different polarities, may be disposed to face each other, with the dielectric layer 111 interposed therebetween. The plurality of first internal electrodes 121 and the plurality of second internal electrodes 122 may be electrically separated from each other by the dielectric layer 111 disposed therebetween.

The plurality of first internal electrodes 121 may be spaced apart from the fourth surface 4 and connected to the third surface 3. In addition, the plurality of second internal electrodes 122 may be spaced apart from the third surface 3 and connected to the fourth surface 4.

The conductive metal included in the internal electrodes 121 and 122 may be at least one of nickel (Ni), copper (Cu), palladium (Pd), silver (Ag), gold (Au), platinum (Pt), tin (Sn), tungsten (W), titanium (Ti) and alloys thereof, but the present disclosure is not limited thereto.

The internal electrodes 121 and 122 may be formed by applying a conductive paste for internal electrodes containing a conductive metal to a predetermined thickness on a ceramic green sheet and sintering the same. A screen-printing method or a gravure printing method may be used as a printing method of the conductive paste for internal electrodes, but the present disclosure is not limited thereto.

The average thickness te of the internal electrodes 121 and 122 is not particularly limited, but may be, for example, 3 μm or less. In addition, the average thickness te of the internal electrodes 121 and 122 may be arbitrarily set according to required characteristics or uses. For example, in the case of electronic components for high-voltage electric vehicles, the average thickness te of the internal electrodes 121 and 122 may be less than 1 μm, and in the case of small IT electronic components, the average thickness te of the internal electrodes 121 and 122 may be 0.4 μm or less to obtain miniaturization and high capacitance, but the present disclosure is not limited thereto.

On the other hand, as described above, in the case of the multilayer electronic component according to an embodiment, as the external electrodes 131 and 132 include the base electrode layers 131a and 132a, the intermediate electrode layers 131b and 132b, and the conductive resin layers 131c and 132c, even when the average thickness te of the internal electrodes 121 and 122 is less than 1 μm or 0.4 μm or less, the reliability of the multilayer electronic component may be improved.

The average thickness te of the internal electrodes 121 and 122 refers to the size of the internal electrodes 121 and 122 in the first direction. In this case, the average thickness of the internal electrodes 121 and 122 may be measured by scanning a cross section of the body 110 in the first and second directions with a scanning electron microscope (SEM) at a magnification of 10,000. In more detail, the average value may be measured by measuring the thicknesses at a plurality of points of one internal electrode 121 or 122, for example, at 30 points equally spaced in the second direction. The 30 equally spaced points may be designated in a capacitance formation portion Ac to be described later. In addition, if the average value is measured by extending this average value measurement to 10 internal electrodes 121 and 122, the average thickness of the internal electrodes 121 and 122 may be further generalized.

The body 110 may include a capacitance formation portion Ac which is disposed inside the body 110 and in which capacitance is formed by including first and second internal electrodes 121 and 122 alternately disposed with the dielectric layer 111 interposed therebetween, and a first cover portion 112 and a second cover portion 113 respectively disposed on both surfaces of the capacitance formation portion Ac, opposing each other in the first direction. The cover portions 112 and 113 may basically serve to prevent damage to the internal electrodes due to physical or chemical stress. The cover portions 112 and 113 may have the same configuration as the dielectric layer 111 except that they do not include internal electrodes.

The body 110 may include margin portions 114 and 115 disposed on both surfaces of the capacitance formation portion Ac, opposing each other in the third direction. For example, the margin portions 114 and 115 may refer to regions between both ends of the internal electrodes 121 and 122 and the boundary surface of the body 110 in the cross-section of the body 110 cut in the first and third directions. At this time, the margin portions 114 and 115 include a first margin portion 114 connected to the fifth surface 5 of the body 110 and a second margin portion 115 connected to the sixth surface 6 of the body 110.

The margin portions 114 and 115 may include the same material as the dielectric layer 111 except that the internal electrodes 121 and 122 are not included. The margin portions 114 and 115 may basically serve to prevent damage to the internal electrodes 121 and 122 due to physical or chemical stress.

The margin portions 114 and 115 may be formed by coating and sintering a conductive paste for internal electrodes on the ceramic green sheet, except where the margin portion is to be formed. Alternatively, to suppress the step difference caused by the internal electrodes 121 and 122, the internal electrodes 121 and 122 are cut to be connected to the fifth and sixth surfaces 5 and 6 of the body after stacking, and then a single dielectric layer or two or more dielectric layers are stacked on both opposite surfaces of the capacitance forming portion Ac in the third direction, thereby forming the margin portions 114 and 115.

The external electrodes 131 and 132 may be disposed on the third and fourth surfaces 3 and 4 of the body 110, and may extend onto portions of the first, second, fifth, and sixth surfaces 1, 2, 5 and 6. In addition, the external electrodes 131 and 132 may include a first external electrode 131 connected to the plurality of first internal electrodes 121 and a second external electrode 132 connected to the plurality of second internal electrodes 122.

In addition, in the first external electrode 131, the area disposed on the third surface 3 may be defined as the first connection portion P1a, the area disposed on the first and second surfaces 1 and 2 may be defined as the first band portion P1b, the area between the first connection portion and the first band portion, disposed on the first corner C1, may be defined as the first corner portion P1c. In the second external electrode 132, the area disposed on the fourth surface 4 may be defined as a second connection portion P2a, the area disposed on the first and second surfaces 1 and 2 may be defined as the second band portion P2b, and the area between the second connection portion and the second band portion, disposed on the second corner C2, may be defined as the second corner P2c.

The first external electrode 131 may include a first base electrode layer 131a disposed on the third surface 3, a first intermediate electrode layer 131b disposed on the first corner C1 and connected to the first base electrode layer, a first conductive resin layer 131c disposed on the first intermediate electrode layer, and a first plating layer 131d disposed on the first conductive resin layer. The second external electrode 132 may include a second base electrode layer 132a disposed on the fourth surface 4, a second intermediate electrode layer 132b disposed on the second corner C2 and connected to the second base electrode layer, a second conductive resin layer 132c disposed on the second intermediate electrode layer, and a second plating layer 132d disposed on the second conductive resin layer.

The first base electrode layer 131a may serve to connect the first internal electrode 121 and the first external electrode 131, and the second base electrode layer 132a may serve to connect the second internal electrode 122 and the second external electrode 132.

The conductive metal included in the first and second base electrode layers 131a and 132a does not need to be particularly limited. For example, the first and second base electrode layers 131a and 132a may include at least one of Ni, Cu, Cr, Sn, Pd, and alloys thereof, and in more detail, may include Ni. When the internal electrodes 121 and 122 and the base electrode layers 131a and 132a contain Ni, the occurrence of radiation cracks due to the difference in diffusion rates of two different metals may be suppressed, and accordingly, bonding force between the internal electrodes 121 and 122 and the base electrode layers 131a and 132a may be secured.

In an embodiment, the first base electrode layer 131a may include a region not covered by the first intermediate electrode layer 131b, and the second base electrode layer 132a may include a region not covered by the second intermediate electrode layer 132b. For example, as illustrated in FIG. 4, the first base electrode layer 131a includes a region not covered by the first intermediate electrode layer 131b in the first connection portion P1a, and the second base electrode layer 132a may include a region not covered by the second intermediate electrode layer 132b in the second connection portion P2a. Accordingly, the capacitance per unit volume of the multilayer electronic component may be improved by reducing the thickness of the central region of the external electrodes 131 and 132 in the first direction.

In this case, the first base electrode layer 131a and the first conductive resin layer 131c may be in contact with each other through a region of the first base electrode layer 131a that is not covered by the first intermediate electrode layer 131b. The second base electrode layer 132a and the second conductive resin layer 132c may contact each other through a region of the second base electrode layer 132a not covered by the second intermediate electrode layer 132b.

In an embodiment, the end of the first base electrode layer 131a is disposed on the first corner C1, and an end of the second base electrode layer 132a may be disposed on the second corner C2. For example, an end of the first base electrode layer 131a may be disposed at the first corner portion P1c, and an end of the second base electrode layer 132a may be disposed at the second corner portion P2c.

The plating solution and/or external moisture penetrating into the body 110 tends to penetrate into the corners C1 and C2 of the body 110 having a short distance to the internal electrodes. At this time, the ends of the first and second base electrode layers 131a and 132a are disposed on the corners C1 and C2 of the body 110, and penetration of the plating solution and/or external moisture into the corners C1 and C2 of the body 110 may be prevented. In addition, by having a structure in which the first and second base electrode layers 131a and 132a do not extend onto the first and second surfaces 1 and 2, capacitance per unit volume of the multilayer electronic component may be secured by reducing the size of the multilayer electronic component in the first direction.

In an embodiment, the base electrode layers 131a and 132a may include glass to secure bonding strength with the body 110. In this case, the base electrode layers 131a and 132a may be formed by transferring sheets including conductive metal and glass onto the third and fourth surfaces 3 and 4, respectively, and then sintering the same. Alternatively, the base electrode layers 131a and 132a may be formed by compressing the body 110 to a sheet including conductive metal and glass, attaching the sheet to the body, and sintering the same.

However, the present disclosure is not limited thereto, and the base electrode layers 131a and 132a may be Ni plating layers. In this case, the base electrode layers 131a and 132a may not include glass. When the base electrode layers 131a and 132a are Ni plating layers, as described above, radiation cracking may be prevented and bonding strength between internal electrodes may be secured. In this case, the base electrode layers 131a and 132a may be formed using an electrolytic plating method and/or an electroless plating method.

In addition, although not illustrated in the drawings, when the base electrode layers 131a and 132a are Ni plating layers, the base electrode layers 131a and 132a may be disposed on both surfaces of the capacitance formation portion Ac opposing each other in the second direction, and ends of the base electrode layers 131a and 132a may be disposed on the cover portions 112 and 113 and/or the margin portions 114 and 115.

The intermediate electrode layers 131b and 132b are basically disposed on the corners C1 and C2 of the body 110, and accordingly, the thickness of the central region of the external electrodes 131 and 132 in the first direction may not be excessively increased. Accordingly, a plating solution and/or external moisture may be prevented from penetrating into the corners C1 and C2 of the body 110 while securing the capacitance per unit volume of the multilayer electronic component.

The method of forming the intermediate electrode layers 131b and 132b does not need to be particularly limited. For example, the intermediate electrode layers 131b and 132b may be formed by applying a conductive paste containing a conductive metal and glass on the corners C1 and C2 of the body 110 and sintering the same.

In addition, as illustrated in FIG. 4, at least a portion of the first intermediate electrode layer 131b is in contact with the first plating layer 131d on the first corner C1, and on the second corner C2, at least a portion of the second intermediate electrode layer 132b may contact the second plating layer 132d. For example, at least a portion of the first intermediate electrode layer 131b may be in contact with the first plating layer 131d at the first corner portion P1c. At least a portion of the second intermediate electrode layer 132b may contact the second plating layer 132d at the second corner portion P2c.

As described above, in the case in which the external electrodes 131 and 132 include the conductive resin layers 131c and 132c to prevent cracking due to mounting, there is a problem in which the ESR of the multilayer electronic component increases due to the conductive resin layers 131c and 132c having high resistance.

Meanwhile, in the case of a multilayer electronic component according to an embodiment of the present disclosure, at least portions of the intermediate electrode layers 131b and 132b on the corners C1 and C2 of the body 110 come into contact with the plating layers 131d and 132d to prevent cracks caused by mounting through the conductive resin layers 131c and 132c, and ESR may be prevented from increasing.

In detail, as at least portions of the intermediate electrode layers 131b and 132b is in contact with the plating layers 131d and 132d on the corners C1 and C2 of the body 110 spaced apart from the internal electrodes 121 and 122, ESR may be effectively reduced without affecting the reliability of multilayer electronic components.

On the other hand, the contact point between the intermediate electrode layers 131b and 132b and the plating layers 131d and 132d may be on the corners C1 and C2 of the body 110 and need not be particularly limited. For example, in at least one cross section among cross sections obtained by cutting a ¼ point, a 2/4 point, and a ¾ point of the third direction of the multilayer electronic component in the first and second directions, at least portions of the intermediate electrode layers 131b and 132b may contact the plating layers 131d and 132d on the corners C1 and C2 of the body 110.

The method of bringing the intermediate electrode layers 131b and 132b into contact with the plating layers 131d and 132d does not need to be particularly limited. For example, the first conductive resin layer 131c may include a first opening H disposed on the first corner C1, the first intermediate electrode layer 131b and the first plating layer 131d contact each other through the first opening, the second conductive resin layer 132c may include a second opening disposed on the second corner C2, and the second intermediate electrode layer 132b and the second plating layer 132d may contact each other through the second opening. For example, the conductive resin layers 131c and 132c may include a plurality of openings disposed at four peripheral sides of the corner portions P1c and P2c, and the intermediate electrode layers 131b and 132b may contact the plating layers 131d and 132d through the plurality of openings.

The conductive resin layers 131c and 132c may include at least one opening disposed on the corners C1 and C2 of the body 110, and the opening may have any shape as long as it may bring the intermediate electrode layers 131b and 132b and the plating layers 131d and 132d into contact with each other.

The method of forming the openings of the conductive resin layers 131c and 132c does not need to be particularly limited, and for example, after coating the conductive resin composition forming the conductive resin layers 131c and 132c on the intermediate electrode layers 131b and 132b, and before curing the conductive resin composition, the opening may be formed by removing at least a portion of the conductive resin composition applied on the corners C1 and C2 of the body 110.

At least portions of the first and second intermediate electrode layers 131b and 132b may extend onto the first and second surfaces 1 and 2. In addition, at least portions of the first and second intermediate electrode layers 131b and 132b may extend onto the fifth and sixth surfaces 5 and 6. In detail, as illustrated in FIGS. 4 and 7, at least portions of the first and second intermediate electrode layers 131b and 132b may directly contact the first and second surfaces 1 and 2. Accordingly, to secure bonding strength with the body 110, each of the first and second intermediate electrode layers 131b and 132b may include glass.

The conductive metal included in the first and second intermediate electrode layers 131b and 132b does not need to be particularly limited, but for example, the first and second intermediate electrode layers 131b and 132b may include at least one of Cu, Ni, Cr, Sn, Pd, and alloys thereof.

In an embodiment, one end of the first intermediate electrode layer 131b and one end of the second intermediate electrode layer 132b may be respectively disposed on the capacitance formation portion Ac. For example, the intermediate electrode layers 131b and 132b may be disposed to cover the outermost internal electrodes in the first direction. Accordingly, penetration of the plating solution and/or external moisture into the inside of the body through the outermost internal electrode may be suppressed. In an embodiment, the intermediate electrode layers 131b and 132b may not cover remaining internal electrodes of the capacitance formation portion Ac except the outermost internal electrodes in the first direction.

The conductive resin layers 131c and 132c are disposed on the intermediate electrode layers 131b and 132b, and at least portions of the first and second conductive resin layers 131c and 132c may extend onto the first and second surfaces 1 and 2. In addition, at least portions of the first and second conductive resin layers 131c and 132c may extend onto the fifth and sixth surfaces 5 and 6.

The conductive resin layers 131c and 132c may include conductive metal and resin. The conductive metal included in the conductive resin layers 131c and 132c may serve to electrically connect the base electrode layers 131a and 132a and the intermediate electrode layers 131b and 132b. The conductive metal included in the conductive resin layers 131c and 132c does not need to be particularly limited, but may include, for example, at least one of Cu, Ni, Ag, Sn, Cr, and alloys thereof.

The shape of the conductive metal included in the conductive resin layers 131c and 132c does not need to be particularly limited, but may include, for example, one or more of spherical particles and flake particles.

In this case, the spherical particle may also include a shape that is not perfectly spherical, and may include a shape in which, for example, a length ratio between a major axis and a minor axis (long axis/short axis) is 1.45 or less. Flake-type particles mean particles having a flat and elongated shape, and are not particularly limited, and for example, the length ratio of the major axis to the minor axis (major axis/minor axis) thereof may be 1.95 or more.

The lengths of the major and minor axes of the spherical particles and flake-shaped particles may be measured from an image obtained by scanning a cross-section of the multilayer electronic component cut in the first and second directions at the center thereof in the third direction with a scanning electron microscope (SEM).

The resin included in the conductive resin layers 131c and 132c may secure bonding and absorb shock. As a result, the conductive resin layers 131c and 132c may have relatively high flexibility. Accordingly, the multilayer electronic component may be protected from external physical shock or bending shock, and cracks may be prevented from occurring in multilayer electronic components by absorbing stress or tensile stress applied during mounting on a board.

The resin included in the conductive resin layers 131c and 132c does not need to be particularly limited, but an insulating resin may be used. For example, at least one of epoxy resin, acrylic resin, and ethyl cellulose may be included.

The plating layers 131d and 132d may improve mounting characteristics. The type of the plating layers 131d and 132d is not particularly limited, and may be a plating layer including Ni, Sn, Pd, and/or alloys including the same, and may be formed of a plurality of layers.

The plating layers 131d and 132d may be, for example, a Ni plating layer or a Sn plating layer, or may have a form in which a Ni plating layer and a Sn plating layer are sequentially formed. In addition, the plating layers 131d and 132d may include a plurality of Ni plating layers and/or a plurality of Sn plating layers.

Hereinafter, the first base electrode layer 131a, the first intermediate electrode layer 131b, and the first conductive resin layer 131c will be described as standards, and since the second external electrode 132 may have a symmetrical relationship with the first external electrode 131 in the second direction, descriptions of the first base electrode layer 131a, the first intermediate electrode layer 131b, and the first conductive resin layer 131c may be equally applied to the second base electrode layer 132a, the second intermediate electrode layer 132b, and the second conductive resin layer 132c.

Referring to FIG. 7, in an embodiment, when the distance in the second direction from the third surface 3 to the end of the first intermediate electrode layer 131b disposed on the first or second surface 1 or 2 is L1 and when the distance from the third surface 3 to the end of the first conductive resin layer 131c disposed on the first or second surface 1 or 2 in the second direction is L2, L2/L1 may be greater than or equal to 2.5. When L2/L1 satisfies 2.5 or more, the effect of preventing penetration of plating solution and/or external moisture and reducing ESR may be more significant.

The method of controlling the L1/L2 is not particularly limited. For example, by adjusting the amount of coating of the conductive paste forming the first intermediate electrode layer 131b on the first base electrode layer 131a or adjusting the amount of coating of the conductive resin composition forming the first conductive resin layer 131c on the first intermediate electrode layer 131c, L1/L2 may be controlled.

L1/L2 may be measured by observing the cross-section of the multilayer electronic component cut in the first and second directions at the center thereof in the third direction using a scanning electron microscope (SEM) at a magnification of 2000 times or more.

Referring to FIG. 7, in an embodiment, when the thickness of the first intermediate electrode layer measured on the first corner C1 is tc, tc may be 2 µm or more. When the tc is greater than or equal to 2 µm, penetration of the plating solution and/or external moisture through the first corner C1 of the body 110 may be more effectively prevented. In addition, when the tc is 2 µm or more, the first intermediate electrode layer 131b and the first plating layer 131d may more easily contact each other, and in this manner, the ESR may be effectively reduced.

The tc may be the thickness of the first intermediate electrode layer 131b measured on the 1-1-th corner C1-1 or the thickness of the first intermediate electrode layer 131b measured on the 1-2-th corner C1-2.

The tc may refer to a minimum thickness of the first intermediate electrode layer measured in a direction perpendicular to the surface of the 1-1-th corner C1-1 or 1-2-th corner C1-2. In addition, the tc may be measured by observing a section cut in the first and second directions at the center of the third direction of the multilayer electronic component using a scanning electron microscope (SEM) at a magnification of 3000 times or more.

Referring to FIGS. 7 and 8, in an embodiment, when the thickness of the first base electrode layer 131a measured at the center of the body 110 in the first direction is t1 and when the thickness of the first base electrode layer 131a measured at the internal electrode on the outermost portion of the body 110 in the first direction is disposed is t1', t1'/t1 may be greater than or equal to 0.8 and less than or equal to 1.0. For example, since the first base electrode layer 131a has a uniform thickness, the capacitance per unit volume of the multilayer electronic component may be improved, and reliability of the multilayer electronic component may be improved by preventing the external electrode from being formed too thin on the first corner C1 of the body 110.

Also, referring to FIGS. 7 and 8, in an embodiment, when the sum of the thicknesses of the first base electrode layer 131a and the first intermediate layer 131b measured on the internal electrode disposed on the outermost side of the body in the first direction is t2, t2>t1 may be satisfied. When t2>t1 is satisfied, the external electrodes 131 and 132 may have a uniform thickness as a whole even when the first conductive resin layer 131c is formed on the first intermediate electrode layer 131b, and accordingly, the capacitance per unit volume of the multilayer electronic component may be improved and reliability of the multilayer electronic component may be improved by preventing the external electrode from being formed too thin on the first corner C1.

In this case, t1 and t1' denote sizes of the first base electrode layer 131a in the second direction, and t2 denotes the sum of sizes of the first base electrode layer 131a and the first intermediate electrode layer 131b in the second direction.

On the other hand, the method of controlling t2 to be greater than t1 and the method of controlling t1/t1' to be 0.8 or more and 1.0 or less do not need to be particularly limited. For example, as the first base electrode layer 131a is formed using a sheet or a plating method, t2 may be controlled to be greater than t1, and t1/t1' may be controlled to be 0.8 or more and 1.0 or less.

Also, t1, t1' and t2 may be measured by observing the cross section cut in the first and second directions at the center of the third direction of the multilayer electronic component with a scanning electron microscope (SEM) at a magnification of 3000 times or more.

Hereinafter, a multilayer electronic component according to another embodiment will be described. However, the multilayer electronic component according to an embodiment may have the same configuration as the above-described multilayer electronic component according to the embodiment. Therefore, description overlapping with the above-described embodiment will be omitted.

The multilayer electronic component 100 according to an embodiment includes a body 110 including a dielectric layer 111 and first and second internal electrodes 121 and 122 alternately disposed with the dielectric layer 111 interposed therebetween, and having first and second surfaces 1 and 2 opposing each other in a first direction, third and fourth surfaces 3 and 4 connected to the first and second surfaces 1 and 2 and opposing each other in a second direction, and fifth and sixth surfaces 5 and 6 connected to the first to fourth surfaces 1, 2, 3 and 4 and opposing each other in a third direction, the body 110 including a first corner C1 connecting the third surface 3 and the first, second, fifth, and sixth 1, 2, 5 and 6 surfaces, respectively, and a second corner C2 connecting the fourth surface 4 and the first, second, fifth, and sixth surfaces 1, 2, 5 and 6, respectively; a first external electrode 131 including a first base electrode layer 131a disposed on the third surface 3, a first intermediate electrode layer 131b disposed on the first corner C1 and connected to the first base electrode layer 131a, a first conductive resin layer 131c disposed on the first intermediate electrode layer 131b, and a first plating layer 131d disposed on the first conductive resin layer 131c; and a second external electrode 132 including a second base electrode layer 132a disposed on the fourth surface 4, a second intermediate electrode layer 132b disposed on the second corner C2 and connected to the second base electrode layer 132a, a second conductive resin layer 132c disposed on the second intermediate electrode layer 132b, and a second plating layer 132d disposed on the second conductive resin layer 132c. The first base electrode layer 131a includes an area not covered by the first intermediate electrode layer 131b, and the second base electrode layer 132a may include an area not covered by the second intermediate electrode layer 132b.

As described above, since the base electrode layers 131a and 132a include regions not covered by the intermediate electrode layers 131b and 132b, capacitance per unit volume of the multilayer electronic component is secured by reducing the thickness of the central region of the external electrodes 131 and 132 in the first direction. In addition, the intermediate electrode layers 131b and 132b disposed on the corners C1 and C2 of the body 110 prevent penetration of a plating solution and/or external moisture to improve reliability of the multilayer electronic component, and cracks due to mounting may be prevented by including the conductive resin layers 131c and 132c.

(Experimental Example)

<Evaluation of Moisture Resistance and ESR According to L2/L1>

First, after preparing a body including a dielectric layer and internal electrodes, a base electrode layer was formed by transferring a sheet including a conductive metal and glass to the body and then sintering the same, and by applying a conductive paste containing conductive metal and glass on the corner of the body on which the base electrode layer is formed and then sintering the same, an intermediate electrode layer was formed. Then, after applying the conductive resin composition to the body on which the intermediate electrode layer is formed, the intermediate electrode layer was exposed by partially removing the conductive resin composition applied to the central region of the corner of the body in the third direction. Thereafter, curing heat treatment was performed to form a conductive resin layer, and a plating layer was formed on the conductive resin layer to prepare a sample chip.

Thereafter, L1 and L2 were measured through images obtained by scanning the cross section in the first and second directions at the center of the sample chip in the third direction with a scanning electron microscope (SEM).

Table 1 below illustrates the number of moisture resistance defects and ESR measured and described according to L2/L1.

In the moisture resistance reliability evaluation, after preparing 400 samples for each test number and mounting the same on the board, and after applying a voltage of 1 Vr for 12 hours at a temperature of 85° C. and a relative humidity of 85%, when the insulation resistance falls by $10^3 \Omega$ or more than the initial value, it is judged to be defective and the number of defective samples is listed in Table 1.

ESR was measured at 1 Mhz using a measuring instrument, and the maximum value of the ESR values measured in 400 samples for each test number is listed in Table 1 below.

TABLE 1

| Test No. | L2/L1 | Moisture Resistance Poor | ESR (mΩ) |
|---|---|---|---|
| 1 | 1.5 | 3/400 | 7.22 |
| 2 | 2.0 | 3/400 | 6.83 |
| 3 | 2.5 | 0/400 | 4.34 |
| 4 | 2.7 | 0/400 | 4.72 |
| 5 | 3.0 | 0/400 | 4.73 |

Referring to Table 1, it can be seen that in Test Nos. 1 and 2, L2/L1 is less than 2.5, resulting in poor moisture resistance and higher ESR than Test Nos. 3 to 5.

On the other hand, in the case of Test Nos. 3 to 5, it can be confirmed that L2/L1 is 2.5 or more, and no moisture resistance defect occurs, and it can be confirmed that the ESR is lower than that of Test Nos. 1 and 2.

<Evaluation of Moisture Resistance and ESR According to tc>

As described above, tc was measured through an image obtained by scanning a cross section of the sample chip in the first and second directions at the center in the third direction with a scanning electron microscope (SEM).

tc was defined as the minimum thickness measured in the direction perpendicular to the surface of the corner of the body in the SEM image, and tc was measured on the 1-1-th corner or 1-2-th corner.

Table 2 below lists the number of moisture resistance defects and ESR measured according to tc. Moisture resistance reliability evaluation and ESR were measured under the same conditions as the above after preparing 400 samples for each test number as described above.

TABLE 2

| Test No. | tc (µm) | Moisture Resistance Poor | ESR (mΩ) |
|---|---|---|---|
| 1 | 0.8 | 8/400 | 7.22 |
| 2 | 1.7 | 5/400 | 6.83 |
| 3 | 2.1 | 0/400 | 4.34 |
| 4 | 2.5 | 0/400 | 4.72 |
| 5 | 3.0 | 0/400 | 4.73 |

Referring to Table 2, it can be seen that in Test Nos. 1 and 2, the tc is less than 2.0 µm and the moisture resistance reliability is poor, and ESR is also higher than Test Nos. 3 to 5.

On the other hand, in the case of Test Nos. 3 to 5, it can be confirmed that the moisture resistance reliability defect does not occur as the tc is 2.0 µm or more, and it can be seen that ESR is lower than Test Nos. 1 and 2.

As set forth above, according to an embodiment, cracks due to mounting may be prevented while securing capacitance per unit volume.

Penetration of a plating solution and/or moisture into the body may be prevented while securing capacitance per unit volume.

An increase in ESR may be prevented while preventing cracks due to mounting.

The present disclosure is not limited by the above-described embodiments and accompanying drawings, but is intended to be limited by the appended claims. Therefore, various forms of substitution, modification and change will be possible by those skilled in the art within the scope of the technical spirit of the present disclosure described in the claims, and this will also be said to fall within the scope of the present disclosure.

In addition, the expression 'an embodiment' does not indicate the same embodiment, and is provided to emphasize and describe different unique characteristics. However, the embodiments presented above are not excluded from being implemented in combination with features of another embodiment. For example, even if a matter described in one specific embodiment is not described in another embodiment, it may be understood as a description related to another embodiment, unless there is a description to the contrary or contradicting the matter in another embodiment.

In addition, expressions such as first and second are used to distinguish one component from another, and do not limit the order and/or importance of the components. In some cases, without departing from the scope of rights, a first element may be named a second element, and similarly, a second element may be named a first element.

While embodiments have been illustrated and described above, it will be apparent to those skilled in the art that modifications and variations could be made without departing from the scope of the present disclosure as defined by the appended claims.

What is claimed is:

1. A multilayer electronic component comprising:
a body including a dielectric layer and first and second internal electrodes alternately disposed with the dielectric layer interposed therebetween, and having a first surface and a second surface opposing each other in a first direction, a third surface and a fourth surface connected to the first and second surfaces and opposing each other in a second direction, and a fifth surface and a sixth surface connected to the first to fourth surfaces and opposing each other in a third direction, the body including a first corner connecting the third surface to the first, second, fifth, and sixth surfaces and a second corner connecting the fourth surface to the first, second, fifth, and sixth surfaces;
a first external electrode including a first base electrode layer disposed on the third surface, a first intermediate electrode layer disposed on the first corner and connected to the first base electrode layer, a first conductive resin layer disposed on the first intermediate electrode layer, and a first plating layer disposed on the first conductive resin layer; and
a second external electrode including a second base electrode layer disposed on the fourth surface, a second intermediate electrode layer disposed on the second corner and connected to the second base electrode layer, a second conductive resin layer disposed on the second intermediate electrode layer, and a second plating layer disposed on the second conductive resin layer,
wherein at least a portion of the first intermediate electrode layer is in contact with the first plating layer on the first corner, and at least a portion of the second intermediate electrode layer is in contact with the second plating layer on the second corner.

2. The multilayer electronic component of claim 1, wherein the first conductive resin layer includes a first opening disposed on the first corner, and the first intermediate electrode layer and the first plating layer contact each other through the first opening, and
the second conductive resin layer includes a second opening disposed on the second corner, and the second intermediate electrode layer and the second plating layer contact each other through the second opening.

3. The multilayer electronic component of claim 1, wherein the first base electrode layer includes a region not covered by the first intermediate electrode layer, and
the second base electrode layer includes a region not covered by the second intermediate electrode layer.

4. The multilayer electronic component of claim 3, wherein the first base electrode layer and the first conductive resin layer are in contact with each other through a region of the first base electrode layer not covered by the first intermediate electrode layer, and
the second base electrode layer and the second conductive resin layer are in contact with each other through a region of the second base electrode layer not covered by the second intermediate electrode layer.

5. The multilayer electronic component of claim 1, wherein the body includes a capacitance formation portion in which capacitance is formed by including the first and second internal electrodes alternately disposed with the dielectric layer interposed therebetween, and a cover portion disposed on both surfaces of the capacitance formation portion opposing in the first direction, and
one end of the first intermediate electrode layer and one end of the second intermediate electrode layer respectively cover outermost internal electrodes of the capacitance formation portion in the first direction.

6. The multilayer electronic component of claim 1, wherein each of the first and second intermediate electrode layers includes glass.

7. The multilayer electronic component of claim 1, wherein an end of the first base electrode layer is disposed on the first corner, and an end of the second base electrode layer is disposed on the second corner.

8. The multilayer electronic component of claim 1, wherein each of the first and second base electrode layers includes glass.

9. The multilayer electronic component of claim 1, wherein each of the first and second base electrode layers is a Ni plating layer.

10. The multilayer electronic component of claim 1, wherein at least portions of the first and second intermediate electrode layers extend onto the first and second surfaces, and
at least portions of the first and second conductive resin layers extend onto the first and second surfaces.

11. The multilayer electronic component of claim 10, wherein when a distance in the second direction from the third surface to an end of the first intermediate electrode layer disposed on the first surface or the second surface is L1, and a distance in the second direction from the third surface to an end of the first conductive resin layer disposed on the first surface or the second surface is L2, L2/L1 is greater than or equal to 2.5.

12. The multilayer electronic component of claim 1, wherein when a thickness of the first intermediate electrode layer measured on the first corner is tc, tc is 2 μm or more.

13. The multilayer electronic component of claim 1, wherein, when a thickness of the first base electrode layer measured at a center of the body in the first direction is t1, and a sum of thicknesses of the first base electrode layer and the first intermediate electrode layer measured at an internal electrode disposed at an outermost portion of the body in the first direction is t2, t2>t1.

14. The multilayer electronic component of claim 1, wherein each of the first and second conductive resin layers includes a conductive metal and a resin.

15. A multilayer electronic component comprising:
a body including a dielectric layer and first and second internal electrodes alternately disposed with the dielectric layer interposed therebetween, and having a first surface and a second surface opposing each other in a first direction, a third surface and a fourth surface connected to the first and second surfaces and opposing each other in a second direction, and a fifth surface and a sixth surface connected to the first to fourth surfaces and opposing each other in a third direction, the body including a first corner connecting the third surface and the first, second, fifth, and sixth surfaces and a second corner connecting the fourth surface and the first, second, fifth, and sixth surfaces;
a first external electrode including a first base electrode layer disposed on the third surface, a first intermediate electrode layer disposed on the first corner and connected to the first base electrode layer, and a first conductive resin layer disposed on the first intermediate electrode layer; and a second external electrode including a second base electrode layer disposed on the fourth surface, a second intermediate electrode layer disposed on the second corner and connected to the second base electrode layer, and a second conductive resin layer disposed on the second intermediate electrode layer, wherein the first base electrode layer includes a region not covered by the first intermediate electrode layer, and the second base electrode layer includes a region not covered by the second intermediate electrode layer.

16. The multilayer electronic component of claim 15, wherein the first base electrode layer and the first conductive resin layer are in contact with each other through a region of the first base electrode layer not covered by the first intermediate electrode layer, and the second base electrode layer and the second conductive resin layer are in contact with each other through a region of the second base electrode layer not covered by the second intermediate electrode layer.

17. The multilayer electronic component of claim 15, wherein the first external electrode includes a first plating layer disposed on the first conductive resin layer, and the second external electrode includes a second plating layer disposed on the second conductive resin layer.

18. A multilayer electronic component comprising:
a body including a dielectric layer and first and second internal electrodes alternately disposed with the dielectric layer interposed therebetween, and having a first surface and a second surface opposing each other in a first direction, a third surface and a fourth surface connected to the first and second surfaces and opposing each other in a second direction, and a fifth surface and a sixth surface connected to the first to fourth surfaces and opposing each other in a third direction, the body including a first corner connecting the third surface and the first, second, fifth, and sixth surfaces and a second corner connecting the fourth surface and the first, second, fifth, and sixth surfaces;
a first external electrode including a first base electrode layer disposed on the third surface, a first intermediate electrode layer disposed on the first corner and connected to the first base electrode layer, and a first conductive resin layer disposed on the first intermediate electrode layer; and
a second external electrode including a second base electrode layer disposed on the fourth surface, a second intermediate electrode layer disposed on the second corner and connected to the second base electrode layer, a second conductive resin layer disposed on the second intermediate electrode layer,
wherein the first conductive resin layer includes at least one first opening disposed on the first corner, and the second conductive resin layer includes at least one second opening disposed on the second corner.

19. The multilayer electronic component of claim 18, wherein the first external electrode further includes a first plating layer disposed on the first conductive resin layer, and the second external electrode further includes a second plating layer disposed on the second conductive resin layer, and the first intermediate electrode layer and the first plating layer contact each other through the at least one first opening, and the second intermediate electrode layer and the second plating layer contact each other through the at least one second opening.

20. The multilayer electronic component of claim 18, wherein the first intermediate electrode layer includes a third opening disposed on the third surface, and the second intermediate electrode layer includes a fourth opening disposed on the fourth surface, and the first base electrode layer and the first conductive resin layer contact each other through the third opening, and the second base electrode layer and the second conductive resin layer contact each other through the fourth opening.

21. The multilayer electronic component of claim 18, wherein an end of the first base electrode layer extends onto the first corner, and an end of the second base electrode layer extends onto the second corner.

22. The multilayer electronic component of claim 18, wherein the body includes a capacitance formation portion in which capacitance is formed by including the first and second internal electrodes alternately disposed with the dielectric layer interposed therebetween, and a cover portion disposed on both surfaces of the capacitance formation portion opposing in the first direction, and one end of the first intermediate electrode layer and one end of the second intermediate electrode layer respectively cover, in the second direction, uppermost and lowermost internal electrodes of the capacitance formation portion in the first direction.

23. The multilayer electronic component of claim 22, wherein the one end of the first intermediate electrode layer and the one end of the second intermediate electrode layer do not cover remaining internal electrodes of the capacitance formation portion except the uppermost and lowermost internal electrodes in the first direction.

24. The multilayer electronic component of claim 18, wherein the at least one first opening includes a plurality of first openings that are disposed on the first corner around the third surface and separated from one another, and the at least one second opening includes a plurality of second openings that are disposed on the second corner around the fourth surface and separated from one another.

25. The multilayer electronic component of claim 24, wherein the plurality of first openings are arranged along four peripheral sides of the first corner, and the plurality of second openings are arranged along four peripheral sides of the second corner.

* * * * *